(12) United States Patent
Schumann

(10) Patent No.: US 11,577,464 B2
(45) Date of Patent: Feb. 14, 2023

(54) APPARATUS FOR ADDITIVELY MANUFACTURING THREE-DIMENSIONAL OBJECTS

(71) Applicant: CONCEPT LASER GMBH, Lichtenfels (DE)

(72) Inventor: Philipp Schumann, Itzgrund-Schottenstein (DE)

(73) Assignee: CONCEPT LASER GMBH, Lichtenfels (DE)

( * ) Notice: Subject to any disclaimer, the term of this patent is extended or adjusted under 35 U.S.C. 154(b) by 929 days.

(21) Appl. No.: 16/289,661

(22) Filed: Mar. 1, 2019

(65) Prior Publication Data

US 2020/0039149 A1 Feb. 6, 2020

(30) Foreign Application Priority Data

Aug. 3, 2018 (EP) .................................... 18187347

(51) Int. Cl.
*B29C 64/393* (2017.01)
*B33Y 30/00* (2015.01)
(Continued)

(52) U.S. Cl.
CPC ........ *B29C 64/393* (2017.08); *B23K 26/0006* (2013.01); *B23K 26/342* (2015.10); *B28B 1/001* (2013.01); *B28B 17/0081* (2013.01); *B29C 64/268* (2017.08); *B33Y 30/00* (2014.12); *B33Y 50/02* (2014.12); *B33Y 10/00* (2014.12)

(58) Field of Classification Search
CPC ..... B29C 64/393; B29C 64/268; B29C 64/40; B29C 64/00; B29C 64/153; B29C 64/20; B29C 64/386; B23K 26/0006; B23K 26/342; B28B 1/001; B28B 17/0081; B33Y 30/00; B33Y 50/02; B33Y 10/00; B33Y 50/00; Y02P 10/25; B22F 10/20;
(Continued)

(56) References Cited

U.S. PATENT DOCUMENTS

2009/0173443 A1 7/2009 Kozlak et al.
2010/0086721 A1 4/2010 Batchelder
(Continued)

FOREIGN PATENT DOCUMENTS

CN 105291440 A 2/2016

OTHER PUBLICATIONS

European Search Report Corresponding to Application No. 18187347 dated Jan. 31, 2019.
(Continued)

*Primary Examiner* — Michael J Brown
(74) *Attorney, Agent, or Firm* — Dority & Manning, P.A.

(57) ABSTRACT

Apparatus (1) for additively manufacturing three-dimensional objects (2) by means of successive layerwise selective irradiation and consolidation of layers of a build material (3) which can be consolidated by means of an energy source (4), wherein a control unit (6) is provided that is adapted to receive or generate encrypted object data relating to at least one three-dimensional object (2) to be built in a, in particular additive, manufacturing process performed on the apparatus (1), wherein the or a control unit (6) is adapted to decrypt the encrypted object data for performing the additive manufacturing process.

20 Claims, 2 Drawing Sheets

Figure 1:
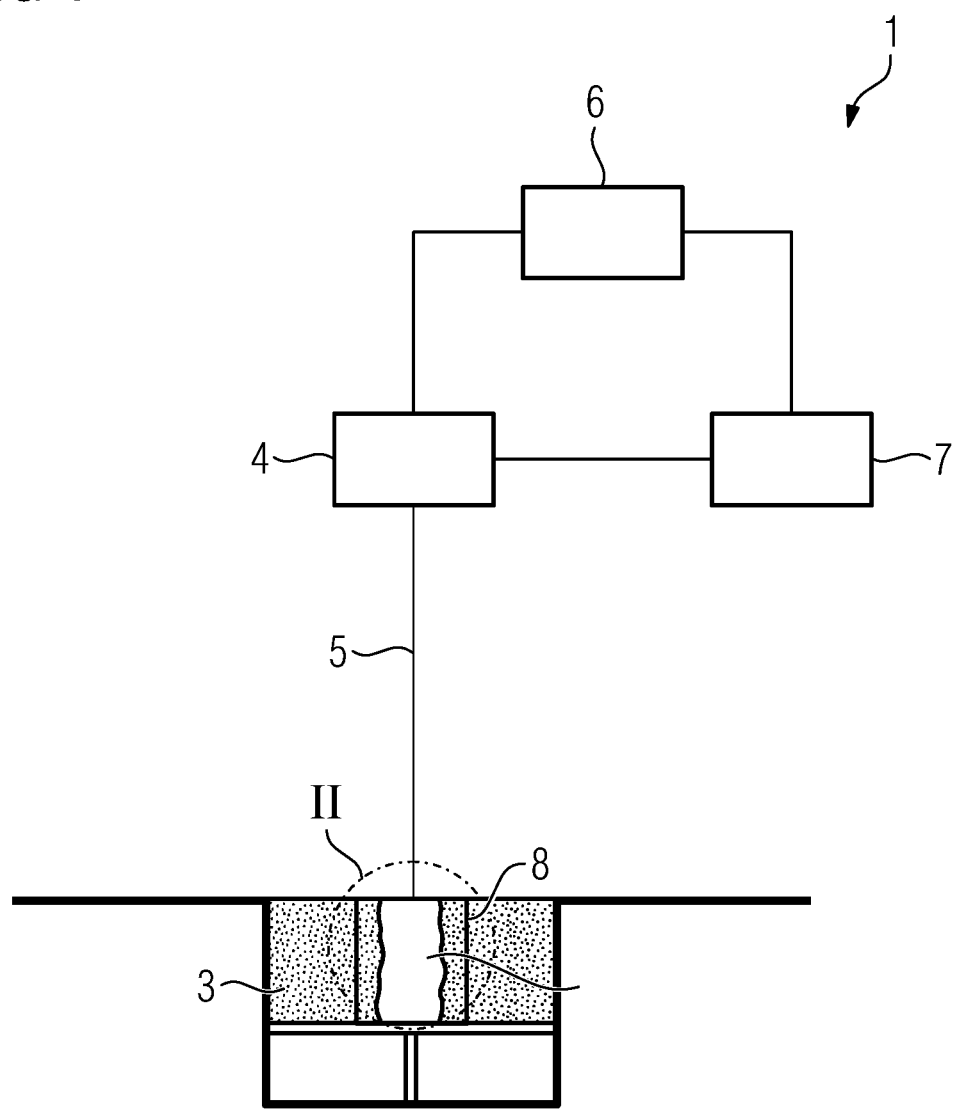

(51) Int. Cl.
  *B33Y 50/02*    (2015.01)
  *B23K 26/342*   (2014.01)
  *B29C 64/268*   (2017.01)
  *B23K 26/00*    (2014.01)
  *B28B 1/00*     (2006.01)
  *B28B 17/00*    (2006.01)
  *B33Y 10/00*    (2015.01)

(58) Field of Classification Search
  CPC .......... B22F 10/30; B22F 12/00; B22F 10/00; B22F 10/10; G06F 21/6209
  USPC .......................................................... 700/117
  See application file for complete search history.

(56)     References Cited

U.S. PATENT DOCUMENTS

| 2014/0119538 | A1* | 5/2014  | Maetz       | G09C 5/00  |
|              |     |         |             | 380/28     |
| 2016/0067927 | A1* | 3/2016  | Voris       | B33Y 50/02 |
|              |     |         |             | 700/98     |
| 2017/0157859 | A1  | 6/2017  | Mahdavi et al. | |
| 2021/0402705 | A1* | 12/2021 | Porter      | B33Y 70/00 |

OTHER PUBLICATIONS

Chinese Search Report and Office Action Corresponding to Application No. 201910711448 dated Feb. 10, 2021.

* cited by examiner

APPARATUS FOR ADDITIVELY MANUFACTURING THREE-DIMENSIONAL OBJECTS

CROSS-REFERENCE TO RELATED APPLICATIONS

This application claims priority to European Patent Application Ser. No. 18 187 347.2 filed Aug. 3, 2018, the contents of which is incorporated herein by reference in its entirety as if set forth verbatim.

The invention relates to an apparatus for additively manufacturing three-dimensional objects by means of successive layerwise selective irradiation and consolidation of layers of a build material which can be consolidated by means of an energy source.

Apparatuses for additively manufacturing three-dimensional object are generally known from prior art, in particular apparatuses in which build material layers are successively applied and selectively consolidated, for example by irradiation with an energy source, such as an energy beam, e.g. a laser beam or an electron beam. As such apparatuses are costly and require a certain effort regarding operation and maintenance of the apparatus, it is common that plant operators provide the apparatus to users for manufacturing three-dimensional objects for users, i.e. clients or customers.

Such third-party manufacturers provide their apparatus for three-dimensional objects to be additively manufactured for users, wherein users willing to have objects additively built that comprise secret three-dimensional shape or a secret geometrical detail face the problem that the third-party manufacturer or even other users using the apparatus will be able to view the manufactured object after the additive manufacturing process is finished or can access the data of the additive manufacturing apparatuses during the additive manufacturing process and therefore, conclude on the secret detail of the three-dimensional object that is built for the user.

It is an object of the present invention to provide an apparatus for additively manufacturing three-dimensional objects that allows for manufacturing three-dimensional objects, wherein the secrecy of secret details of the three-dimensional objects is improved.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that a control unit provided that is adapted to receive or generate encrypted object data relating to at least one three-dimensional object to be built in a, in particular additive, manufacturing process performed on the apparatus, wherein the or a control unit is adapted to decrypt the encrypted object data for performing the additive manufacturing process.

Thus, it is inventively achieved that encrypted object data are generated or received via a control unit, which encrypted object data relate to at least one three-dimensional object to be built in a manufacturing process, for example an additive manufacturing process performed on the apparatus. The or a control unit may further be adapted to decrypt the encrypted object data for performing the additive manufacturing process. In other words, an object is to be manufactured, wherein at least one part of the three-dimensional object is described via the encrypted object data. The term "encrypted" refers to the access of the object data, wherein encrypted object data are not publicly accessible but only available to authorized users, in particular the user that provides the encrypted object data to the control unit for having the related object built on the apparatus.

It is particularly possible that a common manufacturing process is performed on the apparatus and at least one part of the object is built in encrypted form so that at least one part of the geometry of the object or the structure of the object is not visible or is not accessible to unauthorized personnel. It is also possible to have the object partially or entirely build in an additive manufacturing process, wherein the encrypted object data grant access only to authorized personnel.

The term "control unit" may therefore, relate to any unit that is adapted to receive and/or generate object data, such as a personal computer that is used to generate object data, for example via computer aided design (CAD) and which unit is further adapted to encrypt the object data into encrypted object data, that can only be accessed by the or a control unit, for example the control unit that has been used to encrypt the object data or another control unit of an apparatus for additively manufacturing three-dimensional object. Of course, it is also possible that the control unit used to generate the encrypted object data is the same control unit as the control unit of the additive manufacturing apparatus. In either way, it is ensured that only the user or authorized personnel have access to the object data, i.e. are adapted to decrypt the encrypted object data. The decryption performed via the control unit for performing the additive manufacturing process also does not grant access to unauthorized personnel. The decrypted object data in this case are merely available to perform the manufacturing process.

According to a first embodiment of the present invention, the encrypted object data comprise at least one generalized object information that is publicly available. The at least one generalized object information may be used, for example by the plant operator, to determine whether the object the encrypted object data relate to can be manufactured on a specific apparatus. The generalized object information therefore, do not reveal any (secret) detail about the object, in particular relating to the three-dimensional shape or the structure or the geometry of the object to be built, but the generalized object information only relate to generalized data of the object that are necessary for the plant operator to assess whether the object can be built in an additive manufacturing process performed on the apparatus and/or to what conditions, for instance. For example, based on the generalized object information the plant operator can decide whether the object can be built on the apparatus and can estimate certain process parameters, such as the writing time or the type of build material or the required amount of build material, for instance.

Preferably, the at least one generalized object information is or comprises an amount of build material required to build the object and/or a parameter relating to the size of the object, in particular a space required on a build plane or in a build chamber, and/or at least one geometrical parameter, in particular relating to a geometrical detail of the object, and/or a writing time required to build the object.

Thus, the at least one generalized object information can be accessed by the public or at least by a control unit of the apparatus or the plant operator, for instance, to decide whether the object related to the generalized object information can be manufactured on the apparatus. Further, it is possible to determine the conditions, i.e. the costs and the writing time etc., related with the additive manufacturing process. Again, secret geometrical details that are kept under seal are not available to the public and are not contained in the generalized object information. However, the generalized object data may comprise (critical) geometrical details, such as overhangs or slopes to allow for an assessment, whether the object can be manufactured on the apparatus.

The generalized object information may comprise a bounding box of the object. The term "bounding box" refers to a virtual geometrical body bounding the object, i.e. a geometrical body the object can virtually be fit into. Thus, it is possible to make the bounding box or the volume required to additively build the object publicly available, as the bounding box is available in the generalized object information. The bounding box allows for a determination whether the object can be built in an additive manufacturing process, the amount of build material that is required and allows for estimating the writing time, without revealing any geometrical detail of the object. In other words, only generalized dimensions of the object may be made publicly available that allow for a determination of process parameters, such as the volume of the build chamber that is required for building the three-dimensional object.

According to another embodiment of the inventive apparatus, the apparatus may be adapted to build an encryption structure for covering the geometrical structure of at least one part of the object, which encryption structure at least partially encloses the object. Thus, the encryption structure can be used to cover a (secret) geometrical detail or a detail of the structure of the three-dimensional object, for example the shape of a part of the object can be covered. Hence, secret parts of the object, in particular secret parts of the geometry or the shape of the structure of the three-dimensional object can be covered via the encryption structure. Hence, the covered detail of the object is not visible to unauthorized personnel, as the detail is enclosed in the encryption structure. For example, if the additive manufacturing process is finished and the object is taken out of the apparatus, the at least one part of the object that is under seal or that is secret, respectively, is enclosed via the encryption structure to prevent third-party manufacturers or other unauthorized personnel from gaining information about the structure of the object. Instead, only the encryption structure and publicly available parts of the object are visible.

Therefore, the object can be shipped to the user without details of the object becoming publicly available. The user can afterwards remove the encryption structure from the object to obtain the three-dimensional object, e.g. in a confidential environment. By using the encryption structure it is also possible to additively manufacture secret objects in publicly available additive manufacturing apparatuses, wherein the additively manufactured object is at least partially enclosed via the encryption structure in that the geometrical details of the object are not visible. Again, it is possible to build the encryption structure arbitrarily around the object, for example the bounding box of the object, as described before, can be built as encryption structure around the object. For example the bounding box may be understood or chosen as a cylinder or sphere or cuboid surrounding the three-dimensional object. Thus, for third-party manufacturers or unauthorized personnel only the bounding box, i.e. the encryption structure, is visible and the user may remove the encryption structure afterwards.

The inventive apparatus can further be improved in that the encryption structure is a, in particular close contour, massive or foam-like or grid-like shell, at least partially enclosing the object. The encryption structure may therefore, contact or closely follow the contour of the three-dimensional object, in particular closely surrounding the three-dimensional object or adhere to the three-dimensional object, respectively. The encryption structure may be massive or a foam-like or grid-like and may provide a shell around the three-dimensional object or at least partially around the three-dimensional object, wherein the shell at least partially encloses the three-dimensional object, in particular the at least one secret geometrical detail of the three-dimensional object.

The grid or the foam may be used to conceal the geometrical detail of the three-dimensional object and may enable a removal of the encryption structure by the user. Thus, the encryption structure may comprise mechanical properties that assist in the removal of the encryption structure and facilitate the residue-free removal of the encryption structure from the three-dimensional object.

Besides, it is also possible to use the encryption structure as support structure at least partially supporting at least one part of the three-dimensional object during the additive manufacturing process. Certain parts of the three-dimensional objects that require the support of at least one support structure during the additive manufacturing process, such as overhangs or parts with comparatively high slopes, can be supported via the encryption structure providing mechanical stability to support those parts of the object during the additive manufacturing process. For example, the encryption structure being built as bounding box surrounding the three-dimensional object may fill the empty space beneath such a part of the object, for example beneath an overhang, thereby supporting the part of the object.

According to another embodiment of the inventive apparatus, the encryption structure comprises at least one opening for removing non-consolidated build material enclosed between the object and the encryption structure. Hence, it is possible to have a certain volume of non-consolidated build material arranged between the object and the encryption structure, wherein at least one opening in the encryption structure is provided that allows for removing the non-consolidated build material from the object. Thus, for example in a handling station, the non-consolidated build material can be removed from the object in that the non-consolidated build material can be removed, for example sucked, out of the space between the object and the encryption structure through the at least one opening. Thus, it is not necessary to fill the entire space between the object and the encryption structure with build material or to have the user remove the non-consolidated build material himself posing a potential hazard to the user.

Preferably, the encryption structure may comprise at least one predetermined breaking point or at least one predetermined breaking region for removing the encryption structure from the object. For example a material weakening or a tapering, respectively, can be provided that allows for a facilitated removal of the encryption structure from the three-dimensional object.

The encryption structure may further comprise at least one security feature, in particular a three-dimensional code, for proving the integrity of the encryption structure. The three-dimensional code may, for example, be additively manufactured into the encryption structure in that the integrity of the encryption structure maybe proven, for example via non-destructive analysis such as computer tomography. Hence, it is not possible that a third-party, for example unauthorized personnel, removes the encryption structure to view a secret detail of the three-dimensional object and afterwards manufactures the encryption structure onto the object. The security feature may therefore, be preferably encrypted as well in that the security feature in the encryption structure can only be manufactured based on the encrypted object data that can only be decrypted via the control unit and therefore, only by authorized personnel. It is also possible to include a three-dimensional code in the object as well (or alternatively), wherein the three-dimensional code in the object allows for verifying that the three-dimensional object is genuine. Thus, the user may validate that the object received from the additive manufacturing process, e.g. shipped to the user, is the original object.

According to another embodiment of the inventive apparatus, the control unit may be adapted to define a number of objects that can be built using the encrypted object data. In other words, the number of objects that can be built using the encrypted object data may be limited to a certain number of manufacturing processes that can be performed based on the encrypted object data. This allows for limiting the number of objects that can be additively built using the encrypted object data. For example, the user may limit the number of objects that can be built using the encrypted object data to the number of objects that are required, for example one object. This ensures that third-party manufacturer or unauthorized personnel are not able to build multiple objects and remove the encryption structure from one of those objects and ship only the remaining amount of (ordered) objects to the user. Hence, the user can be assured that only the specified number of objects have been manufactured on the apparatus. It is also possible that the encrypted object data have an expiry date, wherein after the encrypted object data are expired, no other examples of the three-dimensional object can be manufactured based on the encrypted object data.

The inventive apparatus may further be improved in that the apparatus may be adapted to restrict access to the additive manufacturing process, in particular the access to at least one determination unit monitoring the process chamber. Thus, it is not possible for third-party manufacturers or unauthorized personnel to access the at least one determination unit or to gain access to the manufacturing process, for example a view of the process chamber during the additive manufacturing process may be restricted. For example, using a window blind unit that covers all windows into the process chamber and conceals the manufacturing process and thereby prevents third party from viewing geometrical details of the three-dimensional object that are not publicly available. It is also possible to restrict the access to a camera or the like filming or capturing images of the interior of the process chamber.

Particularly, it is possible to restrict the access to at least one determination unit that monitors the additive manufacturing process performed in the process chamber. For example, quality management units, such as a meltpool monitoring unit, may be operated during the additive manufacturing process, but the outputs may be encrypted or restricted in that only the user or authorized personnel has access to the output of such determination units. Of course, the chamber access, i.e. the access to the process chamber, can also be restricted in that opening of the process chamber during the additive manufacturing process, for example canceling the manufacturing process and opening the process chamber to gain information about the structure of the three-dimensional object can also be restricted.

Further, the apparatus may be adapted to encrypt at least one process parameter relating to the additive manufacturing process of the object, in that only authorized users are granted access to the process parameter. In other words, it is possible that process parameters, such as the irradiation parameters or other parameters directly influencing the additive manufacturing process and/or parameters that are measured or determined during the additive manufacturing process, for example via a determination unit monitoring the process chamber, can be encrypted and only authorized users can be granted access to those parameters. This ensures that only authorized users can access the process parameters, for example with which irradiation strategy the object is irradiated or with which energy or intensity the object is irradiated and the like, to prevent secrets from becoming publicly available. Thus, only authorized users can access those parameters.

It is also possible to include a fail-safe procedure that ensures that access is only granted after e.g. the encryption structure is finished. For example, if an error or an outage occurs during the additive manufacturing process, the access to the process chamber can be (kept) restricted. The access can be restricted as longs as the object is not enclosed via the encryption structure, for instance. It is also possible that, if the manufacturing process cannot be finished, details of the object are obscured, e.g. by completely consolidating the uppermost layer of the part of the object that was finished until the error/outage. It is also possible to destroy (secret) details of the object before access is granted to the process chamber.

Preferably, the at least one encrypted process parameter can be transmitted or stored. As described before, the process parameter can be encrypted in that only authorized personnel or authorized users gain access to the process parameter, wherein it is also possible to store the process parameter or transmit the process parameter, for example to the user that ordered the additive manufacturing of the three-dimensional object. Thus, the user may verify that certain process parameters were fulfilled in the additive manufacturing process and may check whether the setting of the process parameters was correct. Further, the user may derive whether the process parameters were chosen properly or whether a readjustment of the process parameter is necessary.

Besides, the invention relates to a control unit for receiving and/or generating object data relating to at least one three-dimensional object to be built with an apparatus for additively manufacturing three-dimensional objects, in particular an inventive apparatus, as described before, wherein the control unit is adapted to receive or generate encrypted object data relating to at least one three-dimensional object to be built in a, in particular additive, manufacturing process performed on the apparatus, wherein the control unit is adapted to decrypt the encrypted object data for performing the additive manufacturing process. The inventive control unit may for example be used in publicly available additive manufacturing apparatuses or plants comprising multiple additive manufacturing apparatuses that are publicly available, i.e. plants or apparatuses on which multiple users can additively built three-dimensional objects, for example based on provided object data.

Further, the invention relates to a method for operating at least one apparatus for additively manufacturing three-dimensional objects by means of successive layerwise selective irradiation and consolidation of layers of a build material which can be consolidated by means of an energy source, in particular an inventive apparatus, as described before, wherein encrypted object data relating to at least one three-dimensional object to be built in a, in particular additive, manufacturing process are generated via a control unit, wherein the control unit or the apparatus is adapted to decrypt the encrypted object data for performing an additive manufacturing process.

Self-evidently, all details, features and advantages described with respect to the inventive apparatus are fully transferable to the inventive control unit and the inventive method and vice versa.

Figure 2:
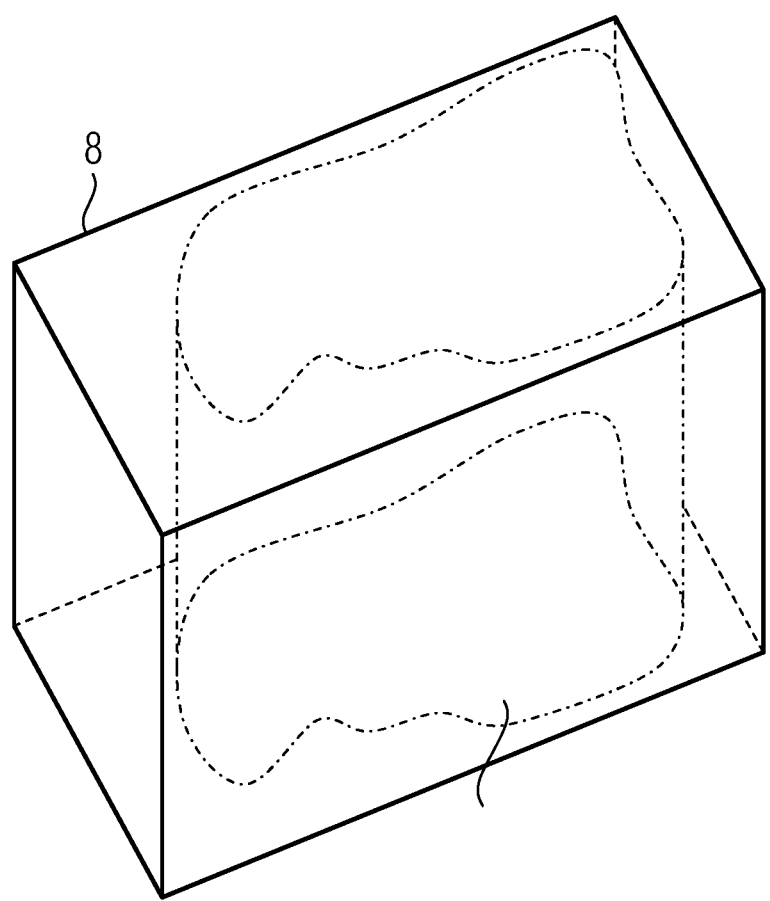

Exemplary embodiments of the invention are described with reference to the Fig. The Fig. are schematic diagrams, wherein FIG. 1 shows an inventive apparatus; and FIG. 2 shows the detail II from FIG. 1.

FIG. 1 shows an apparatus 1 for additively manufacturing three-dimensional objects 2 by means of successive layerwise selective irradiation and consolidation of layers of a build material 3 which can be consolidated by means of an energy source 4, for example generating an energy beam 5, such as a laser beam or an electron beam, for instance.

The apparatus 1 comprises a control unit 6 that is adapted to receive and generate encrypted object data relating to the at least one three-dimensional object 2 to be built in the manufacturing process performed on the apparatus 1. In this exemplary embodiment of the apparatus 1 is built as additive manufacturing apparatus, as described before. The control unit 6 (or another control unit) is adapted to decrypt the encrypted object data for performing the additive manufacturing process. In other words, the control unit 6 may be arranged external to the apparatus 1, wherein a user ma generate the object data relating to the object 2 and may encrypt the object data into encrypted object data. The encrypted object data may be decrypted by a control unit 6 of the apparatus 1 to perform the additive manufacturing process in which the object 2 is manufactured. Of course, a single control unit 6 may perform both tasks or a control unit 6 of the apparatus 1 may receive encrypted object data generated outside the apparatus 1, e.g. on a personal computer of a user, and may decrypt the encrypted object data for performing the additive manufacturing process.

In this exemplary embodiment the control unit 6 receives encrypted object data comprising generalized object information that are publicly available, for example to a plant operator of the apparatus 1 that provides the apparatus 1 to the public in that users can have three-dimensional objects 2 additively built on the apparatus 1.

The encrypted object data therefore, comprise all geometrical details of the object 2 to be additively manufactured, wherein secret geometrical details are restricted and not publicly available. The generalized object information that are publicly available and are comprised in the object data, e.g. form a section of the encrypted object data which is publicly accessible and not encrypted, comprise information relating to an amount of build material that is required to build the object 2 and parameters relating to the size of the object 2, namely the "bounding box" of the object 2, as will be described with respect to FIG. 2 below. Also, the generalized object information comprise a writing time that is required to build the object 2. Thus, the plant operator can decide whether the object 2 can be built on the apparatus 1 and to what conditions for the respective user that orders the object 2 to be built.

The bounding box, as depicted in FIG. 2, is a virtual geometrical body surrounding the object 2, wherein the bounding box generalizes the dimension and the geometrical details in that only estimated or approximate dimensions of the object 2 are publicly available. Again, the structure of the object 2 and geometrical details or the three-dimensional shape of the object 2 are not publicly available and cannot be derived from the bounding box of the object 2.

As described before, the control unit 6 is adapted to receive the encrypted object data and decrypt the encrypted object data for performing the additive manufacturing process on the apparatus 1. Thus, unauthorized personnel, the third-party manufacturer, i.e. the plant operator, or other users using the apparatus 1, are not granted access to the encrypted object data and therefore, do not gain information about the three-dimensional shape or structure or other secret geometrical details of the object 2.

The control unit 6 is further adapted to control a determination unit 7 in that parameters derived or determined via the determination unit 7, such as a meltpool monitoring unit, e.g. capturing videos or pictures of the manufacturing process of the object 2 are restricted and are not made publicly available. The control unit 6 is in particular adapted to encrypt those parameters and send those parameters to the user that ordered the additive manufacturing process of the object 2. Additionally, the control unit 6 may encrypt all process parameters, such as the irradiation parameters based on which the energy source 4 is operated.

Further, the control unit 6 is adapted to build an encryption structure 8 for covering the secret geometrical structure, in particular secret geometrical details or the geometrical shape, of at least one part of the object 2. In the exemplary embodiment that is depicted in FIG. 2, the encryption structure 8 is built as the bounding box of the object 2 that surrounds the object 2 and covers all geometrical details of the object 2. In other words, after the additive manufacturing process is finished, the encryption structure covers the object 2 entirely or at least one secret part of the object 2, in that third-party manufacturers or other users are not able to view geometrical details or the structure of the object 2.

The encryption structure 8 according to this exemplary embodiment is built as a foam-like structure that can be easily removed, as the mechanical stability of the encryption structure 8 is comparatively weak compared with the object 2. In particular, different process parameters may be used to manufacture the encryption structure than manufacturing the object 2, preferably other irradiation parameters. Thus, the user may remove the encryption structure 8 along the outer contour of the object 2.

Further, the encryption structure 8 may contact the object 2 merely in selective spots to reduce the area in which the encryption structure contacts the object 2. This allows for reducing the effort of removing the encryption structure 8 from the object 2.

The encryption structure 8 may also be used as support structure supporting overhangs or other parts of the object 2, such as slopes that need to be supported during the additive manufacturing process. The foam-like encryption structure 8 that is depicted in FIG. 2 can support such parts of the object 2 during the additive manufacturing process, without the need for an additional support structure.

The encryption structure 8 further comprises at least one security feature (not shown), in particular a three-dimensional code. The three-dimensional code can be used to prove the integrity of the encryption structure 8. For example via a non-destructive analysis process, such as computer tomography.

Of course, the inventive method may be performed on the inventive apparatus, preferably using an inventive control unit.

The invention claimed is:

1. An apparatus for additively manufacturing a three-dimensional object by successive layerwise selective irradiation and consolidation of layers of a build material by an energy source, the apparatus comprising:
    a control unit adapted to receive or generate encrypted object data relating to at least one three-dimensional object to be built by an additive manufacturing process performed on the apparatus,
    the control unit further adapted to decrypt the encrypted object data for performing the additive manufacturing process, wherein the encrypted object data comprise at least one generalized object information,
    the control unit further adapted to access the at least one generalized object information, and
    the control unit further adapted to decide if the at least one three-dimensional object related to the at least one generalized object information can be manufactured on the apparatus,
    wherein the apparatus is adapted to build an encryption structure covering a geometrical structure of at least one part of the at least one three-dimensional object, the encryption structure comprising mechanical properties for removal from the geometrical structure.

2. The apparatus according to claim 1, wherein the encrypted object data comprise at least one generalized object information that is publicly available.

3. The apparatus according claim 2, wherein the at least one generalized object information comprises at least one of
    an amount of the build material required to build the at least one three-dimensional object;
    a parameter relating to a size of the at least one three-dimensional object;
    an amount of space required on a build plane;
    an amount of space required in a build chamber;
    at least one geometrical parameter relating to a geometrical detail of the at least one three-dimensional object; and
    a writing time required to build the at least one three-dimensional object.

4. The apparatus according to claim 2, wherein the at least one generalized object information comprises a bounding box of the at least one three-dimensional object.

5. The apparatus according to claim 1, wherein the encryption structure at least partially encloses the at least one three-dimensional object.

6. The apparatus according to claim 5, wherein the encryption structure is a close contour, massive or foam-like or grid-like shell at least partially enclosing the at least one three-dimensional object.

7. The apparatus according claim 5, wherein the encryption structure comprises at least one opening for removing non-consolidated build material enclosed between the at least one three-dimensional object and the encryption structure.

8. The apparatus according to claim 5, wherein the encryption structure comprises at least one predetermined breaking point or at least one predetermined breaking region for removing the encryption structure from the at least one three-dimensional object.

9. The apparatus according to claim 5, wherein the encryption structure comprises at least one security feature or a three-dimensional code for proofing integrity of the encryption structure.

10. The apparatus according to claim 1, wherein the control unit is further adapted to define a number of the at least one three-dimensional object that can be built using the encrypted object data.

11. The apparatus according to claim 1, wherein the apparatus is adapted to restrict access to the additive manufacturing process or restrict access to at least one determination unit monitoring a process chamber.

12. The apparatus according to claim 1, wherein the apparatus is adapted to encrypt at least one process parameter relating to the additive manufacturing process of the at least one three-dimensional object to only grant an authorized user access to the at least one encrypted process parameter.

13. The apparatus according to claim 12, wherein the at least one encrypted process parameter can be transmitted or stored.

14. A control unit for receiving or generating object data relating to at least one three-dimensional object to be built using the apparatus of claim 1, wherein the control unit is adapted to receive or generate the encrypted object data relating to the at least one three-dimensional object to be built by the additive manufacturing process performed on the apparatus, to decrypt the encrypted object data for performing the additive manufacturing process, to access the at least one generalized object information, and to decide if the at least one three-dimensional object related to the at least one generalized object information can be manufactured on the apparatus.

15. A method for operating the apparatus of claim 1, comprising:
    generating via the control unit the encrypted object data relating to the at least one three-dimensional object to be built by the additive manufacturing process performed on the apparatus;
    decrypting via the control unit the encrypted object data for performing the additive manufacturing process,
    accessing via the control unit the at least one generalized object information, and
    deciding via the control unit if the at least one three-dimensional object related to the at least one generalized object information can be manufactured on the apparatus.

16. The method according to claim 15, further comprising:
   building via the apparatus the encryption structure for covering the geometrical structure of the at least one part of the at least one three-dimensional object, the encryption structure at least partially enclosing the at least one three-dimensional object.

17. The method according to claim 16, wherein the encryption structure is a close contour, massive or foam-like or grid-like shell at least partially enclosing the at least one three-dimensional object.

18. The method according to claim 16, wherein the encryption structure comprises at least one opening for removing non-consolidated build material enclosed between the at least one three-dimensional object and the encryption structure.

19. The method according to claim 16, wherein the encryption structure comprises at least one predetermined breaking point or at least one predetermined breaking region for removing the encryption structure from the at least one three-dimensional object.

20. The method according to claim 15, further comprising:
   encrypting via the apparatus at least one process parameter relating to the additive manufacturing process of the at least one three-dimensional object to only grant an authorized user access to the at least one encrypted process parameter.

* * * * *